United States Patent
Li et al.

(10) Patent No.: US 11,300,829 B2
(45) Date of Patent: Apr. 12, 2022

(54) OPTICAL SHEET, BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xiaohu Li, Beijing (CN); Hanyan Sun, Beijing (CN); Inho Park, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 432 days.

(21) Appl. No.: 16/075,438

(22) PCT Filed: Jan. 26, 2018

(86) PCT No.: PCT/CN2018/074342
§ 371 (c)(1),
(2) Date: Aug. 3, 2018

(87) PCT Pub. No.: WO2019/019582
PCT Pub. Date: Jan. 31, 2019

(65) Prior Publication Data
US 2020/0348565 A1    Nov. 5, 2020

(30) Foreign Application Priority Data
Jul. 28, 2017    (CN) .......................... 201710628705.1

(51) Int. Cl.
*G02F 1/13357*    (2006.01)
*G02F 1/1335*    (2006.01)

(52) U.S. Cl.
CPC ............... *G02F 1/133606* (2013.01); *G02F 1/133603* (2013.01); *G02F 1/133605* (2013.01); *G02F 1/133607* (2021.01)

(58) Field of Classification Search
CPC ......... G02F 1/133606; G02F 1/133603; G02F 1/133605; G02F 1/133607
See application file for complete search history.

(56) References Cited

U.S. PATENT DOCUMENTS

| | | | |
|---|---|---|---|
| 2002/0105638 A1* | 8/2002 | Kobayashi | G01N 21/95 356/239.1 |
| 2007/0047058 A1* | 3/2007 | Lim | H04N 13/31 359/267 |
| 2010/0201912 A1* | 8/2010 | Ikeda | G02F 1/1309 349/62 |

(Continued)

FOREIGN PATENT DOCUMENTS

| | | |
|---|---|---|
| CN | 1421728 A | 6/2003 |
| CN | 101743502 A | 6/2010 |
| CN | 202469747 U | 10/2012 |

(Continued)

OTHER PUBLICATIONS

International Search Report and Written Opinion for International Appl. No. PCT/CN2017/102480, dated Apr. 28, 2018.

(Continued)

*Primary Examiner* — Fatima N Farokhrooz
(74) *Attorney, Agent, or Firm* — Dinsmore & Shohl LLP

(57) ABSTRACT

This disclosure provides an optical sheet, a backlight module and a display device. A transparent photochromic material is coated on at least part of the locations (A) on a surface of the optical sheet (11). The backlight module comprises a light source (131), a light guide plate, and the above (Continued)

described optical sheet (111, 112). The display device comprises the said backlight module.

13 Claims, 3 Drawing Sheets

(56) References Cited

U.S. PATENT DOCUMENTS

| | | | |
|---|---|---|---|
| 2011/0051044 A1* | 3/2011 | Segawa | G02B 5/0278 349/64 |
| 2012/0243224 A1* | 9/2012 | Kuwaharada | G02B 3/04 362/237 |
| 2013/0208333 A1* | 8/2013 | Lam | B60J 3/04 359/241 |
| 2014/0340727 A1* | 11/2014 | Mori | C08G 18/10 359/241 |
| 2015/0036204 A1 | 2/2015 | Branda et al. | |
| 2015/0346401 A1* | 12/2015 | Lin | G02B 30/30 359/242 |
| 2017/0023806 A1* | 1/2017 | Wehlus | H01L 51/5268 |
| 2017/0052298 A1* | 2/2017 | Amin | G02F 1/133509 |
| 2018/0304727 A1* | 10/2018 | Choi | B60J 3/06 |
| 2019/0004336 A1* | 1/2019 | Mori | C08G 18/792 |
| 2019/0049791 A1* | 2/2019 | Yanai | G02F 1/1323 |

FOREIGN PATENT DOCUMENTS

| | | |
|---|---|---|
| CN | 104871051 A | 8/2015 |
| CN | 105546472 A | 5/2016 |
| CN | 105612228 A | 5/2016 |
| CN | 105860954 A | 8/2016 |
| CN | 205942162 U | 2/2017 |
| CN | 107422528 A | 12/2017 |
| KR | 20150015278 A | 2/2015 |

OTHER PUBLICATIONS

First Office Action for CN Appl. No. 201710628705.1, dated Sep. 4, 2019.

* cited by examiner

OPTICAL SHEET, BACKLIGHT MODULE AND DISPLAY DEVICE

CROSS-REFERENCE TO RELATED APPLICATIONS

This application is a U.S. National Stage Application under 35 U.S.C. § 371 of International Application No. PCT/CN2018/074342 filed on Jan. 26, 2018, which claims the priority to the Chinese Patent Application No. 201710628705.1, filed on Jul. 28, 2017. The disclosures of each of these applications are hereby incorporated herein by reference in their entirety into this application.

TECHNICAL FIELD

The present disclosure relates to an optical sheet, a backlight module and a display device.

BACKGROUND

In the liquid crystal display, due to factors such as fewer number of LEDs (Light Emitting Diodes) used on the backlight module, unreasonable design of a distance from the LED light emitting surface to the effective display area of the display panel and a spacing between the LEDs on the light strip, a large movable range of the light guide plate, as well as unreasonable design of grids on the light guide plate, an obvious phenomenon of uneven brightness, known as Hotspot (firefly) phenomenon, occurs on a side of the backlight module close to the LED, which makes brightness of the light emitted by the backlight module uneven.

At present, generally a light incidence side of the light guide plate is processed to from a V-shaped groove (V-Cut), thereby to improve brightness uniformity of the light emitted by the backlight module.

SUMMARY

This present disclosure discloses an optical sheet, wherein a transparent photochromic material is on at least part of the locations on a surface of the optical sheet.

Alternatively, when a transparent photochromic material is in at least part of the locations on a surface of the optical sheet, a width of the photochromic material is 10 mm to 20 mm.

Alternatively, a thickness of the photochromic material is less than 200 μm.

Alternatively, the photochromic material comprises an organic photochromic material.

Alternatively, the organic photochromic material comprises one or more of spiropyrans, fulgides, diarylethenes, or azobenzenes.

Alternatively, the photochromic material comprises an inorganic photochromic material.

Alternatively, the inorganic photochromic material comprises one or more of transition metal oxides, metal halides, or rare earth complexes.

Alternatively, the photochromic material comprises a transparent resin mixed with photochromic pigments.

This disclosure further discloses a backlight module comprising a light source, a light guide plate, and the aforementioned optical sheet.

Alternatively, the photochromic material is close to the light source of the backlight module, to shield bright spots when the bright spots appear in a location on the light guide plate of the backlight module and near the light source.

Alternatively, the optical sheet comprises one or more of a diffusion sheet, a prism sheet, or a reflector sheet.

Alternatively, the light source is a LED light source.

This disclosure further discloses a display device comprising the aforementioned backlight module.

DETAILED DESCRIPTION

Illustrative embodiments of this disclosure will be described in detail below with reference to the accompanying drawings. Although the illustrative embodiments of this disclosure are shown in the accompanying drawings, it should be understood that, this disclosure can be implemented in various forms and should not be restricted by the embodiments described herein. In contrast, these embodiments are provided in order to understand this disclosure more thoroughly and to fully convey the scope of this disclosure to those skilled in the art.

When applying the related art, the inventor found that the V-shaped grooves were used in the related art to improve brightness uniformity of the light emitted by the backlight module, but the improvement was poor, and since a lot of debris was often introduced in the process of processing the V-shaped grooves, it is easily to induce scratched white spots.

Firstly, the principle of photochromism will be simply introduced.

Photochromism refers to that, a molecular structure of a certain compound will change under the light of certain wavelength and intensity, as a result, its peak of the absorption to light, i.e., its color, correspondingly changes, and such a change is generally reversible.

Figure 1:
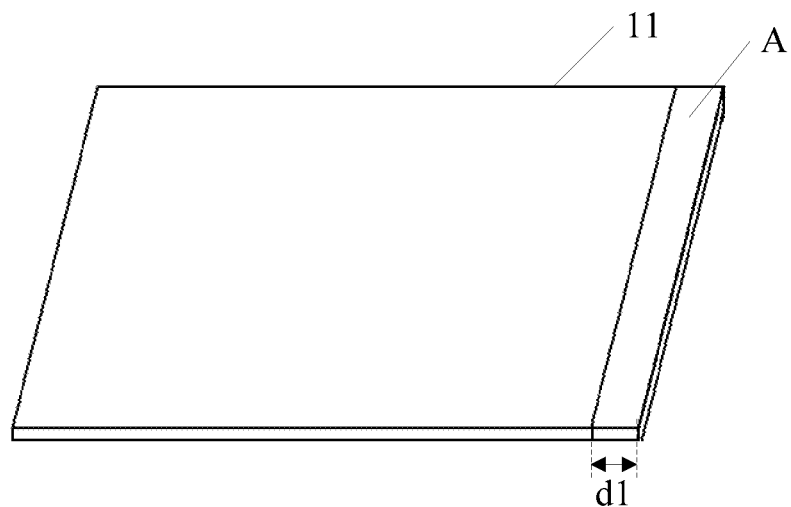
FIG. 1 is a schematic diagram showing a structure of an optical sheet according to some embodiments of this disclosure.

FIG. 1 is a schematic diagram showing a structure of an optical sheet according to some embodiments of this disclosure.

The embodiments of this disclosure provide an optical sheet, and a transparent photochromic material is coated in at least part of the locations A on a surface of the optical sheet 11.

In the embodiments of this disclosure, the photochromic material can be coated on an entire surface of the optical sheet, or the photochromic material can be coated only locally on the optical sheet. Alternatively, when a transparent photochromic material is coated in part of the locations on the surface of the optical sheet, a coating width dl of the photochromic material is 10 mm to 20 mm. The width can effectively shield the bright spots, improve brightness uniformity of the light passing through the optical sheet, and save the photochromic material.

A coating thickness of the photochromic material is mainly limited by a total thickness of the optical sheet. At present, the total thickness of most optical sheets is less than 300 μm, so the coating thickness of the photochromic material is less than 200 μm. Alternatively, the coating thickness can be less than 100 μm. Without affecting the total thickness of the optical sheet, the coating thickness can be set correspondingly according to actual situations.

Alternatively, the photochromic material comprises an organic photochromic material. The organic photochromic material comprises spiropyrans, fulgides, diarylethenes, azobenzenes.

Alternatively, the photochromic material comprises an inorganic photochromic material. The inorganic photochromic material comprises transition metal oxides, metal halides, rare earth complexes.

Alternatively, the photochromic material comprises a transparent resin mixed with photochromic pigments. The larger a proportion of the photochromic pigments mixed in the transparent resin, the lower the transmittance of light, and the smaller the proportion of the photochromic pigments mixed in the transparent resin, the higher the transmittance of light.

The optical sheet in the embodiments of this disclosure may be a diffusion sheet, a prism sheet and a reflector sheet, and a transparent photochromic material can be coated in at least part of the locations on the surface of any one or more optical sheets.

For example, the transparent photochromic material can be coated in at least part of the locations on the surface of the diffusion sheet. The transparent photochromic material can be also coated in at least part of the locations on the surface of the prism sheet. The transparent photochromic material can also be coated in at least part of the locations on the surface of the diffusion sheet and the prism sheet. The photochromic material maintains a transparent color when the brightness of the light incident to the optical sheet is even. When the light incident to the optical sheet is uneven, the light intensity at the corresponding bright spot is larger than a critical light intensity value for which the photochromic material changes color, which makes the photochromic material change from transparent to black. Therefore, it can effectively shield the bright spots, reduce the light transmittance at the bright spots, reduce a brightness difference between bright spots and dark spots, so as to improve brightness uniformity of the light passing through the optical sheet.

The critical light intensity value for which the photochromic material changes color is generally related to a property of the photochromic material and a target brightness of the light.

It should be noted that, the photochromic material is coated in at least part of the locations on the surface of the optical sheet, and when the light incident to the optical sheet has an uneven brightness, the light intensity value at the corresponding bright spot is larger than the critical light intensity value for which the photochromic material changes color, which makes the photochromic material change from transparent to black. At this time, the photochromic material at the bright spot cannot completely shield the light at the bright spot, and the transmittance of the light at the spot is reduced, so that a final display brightness at the bright spot is decreased, which reduces the brightness difference between bright spots and dark spots, and improves brightness uniformity of the light passing through the optical sheet.

In an embodiment of this disclosure, a transparent photochromic material is coated in at least part of the locations on the surface of the optical sheet, and when the light incident to the optical sheet has an uneven brightness, the light intensity value at the corresponding bright spot is larger than the critical light intensity value for which the photochromic material changes color, which makes the photochromic material change from transparent to black. Therefore, it can effectively shield the bright spot, decrease the light transmittance at the bright spot, reduce the brightness difference between bright spots and dark spots, so as to improve brightness uniformity of the light passing through the optical sheet.

Some embodiments of this disclosure provide a backlight module comprising a light source, a light guide plate and the aforementioned optical sheet. A transparent photochromic material is coated in at least part of the locations on a surface of the optical sheet.

When a transparent photochromic material is coated in at least part of the locations on the surface of the optical sheet, a coating width of the photochromic material is 10 mm to 20 mm. A coating thickness of the photochromic material is less than 200 μm.

The photochromic material comprises an organic photochromic material. The organic photochromic material comprises spiropyrans, fulgides, diarylethenes, azobenzenes. The photochromic material comprises an inorganic photochromic material. The inorganic photochromic material comprises transition metal oxides, metal halides, rare earth complexes.

The photochromic material comprises a transparent resin mixed with photochromic pigments.

In the embodiments of this disclosure, the photochromic material is coated close to the light source of the backlight module, to shield bright spots when the bright spots appear on the locations on the light guide plate of the backlight module and near the light source.

The optical sheet comprises one or more of a diffusion sheet, a prism sheet, and a reflector sheet. The light source is a LED light source. The backlight module is a side-entry backlight module.

Figure 2:
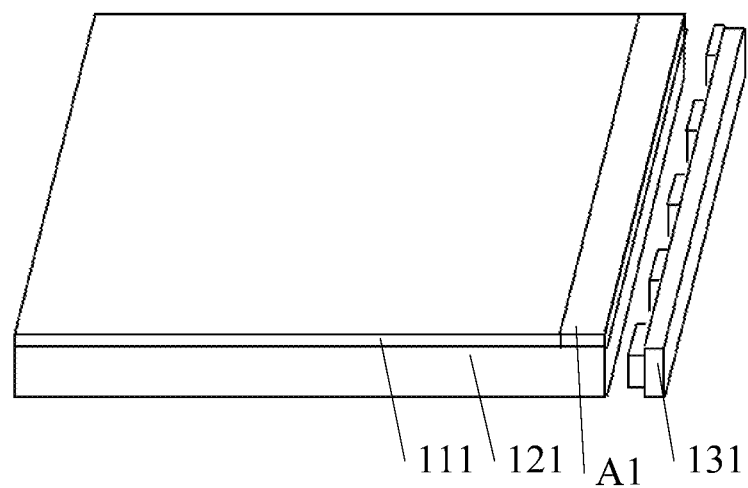
FIG. 2 is a schematic diagram showing a structure of a backlight module in which a photochromic material is coated on a surface of a diffusion sheet, according to some embodiments of this disclosure.

FIG. 2 is a schematic diagram showing a structure of a backlight module in which a photochromic material is coated on a surface of a diffusion sheet, according to some embodiments of this disclosure.

When the optical sheet is a diffusion sheet of the backlight module, a transparent photochromic material is coated on the surface of the diffusion sheet 111, and the photochromic material is coated in a location A1 close to the light source 131 of the backlight module. 121 refers to a combination of a prism sheet, a light guide plate and a reflector sheet in the backlight module, the prism sheet in 121 has the same structure as the prism sheet in the related technologies, and the reflector sheet in 121 has the same structure as the reflector sheet in the related technologies.

Figure 3:
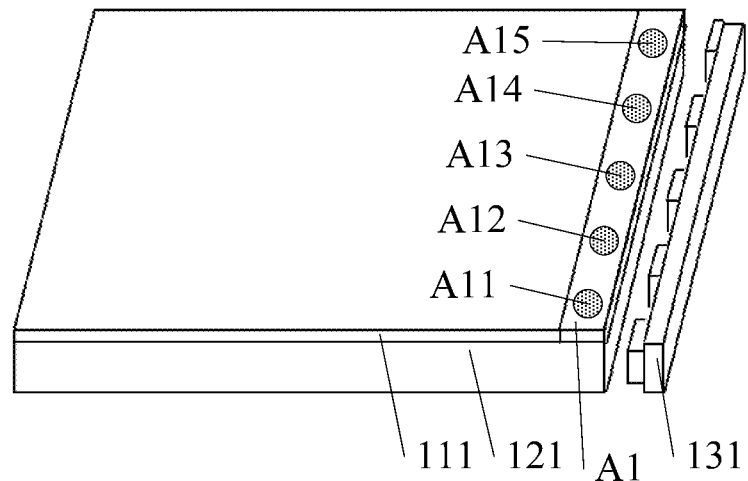
FIG. 3 is a schematic diagram showing a structure of a backlight module in which a photochromic material is coated on a surface of a diffusion sheet, after its brightness uniformity is improved, according to some embodiments of this disclosure.

FIG. 3 is a schematic diagram showing a structure of a backlight module in which a photochromic material is coated on a surface of a diffusion sheet, after its brightness uniformity is improved, according to some embodiments of this disclosure.

After the light source 131 is lighted, the photochromic material on the surface of the diffusion sheet 111 maintains a transparent color when the brightness of the light incident to the diffusion sheet 111 is even. When the light incident to the diffusion sheet 111 has an uneven brightness, the light intensity value at the bright spot is larger than the critical light intensity value for which the photochromic material changes color, which makes the photochromic material at the bright spots change from transparent to black, which is shown as A11, A12, A13, A14 and A15 in FIG. 3. Therefore, it can effectively shield the bright spot, decrease the light transmittance at the bright spot, reduce the brightness difference between the bright spots and the dark spots, so as to improve brightness uniformity of the light passing through the diffusion sheet.

Figure 4:
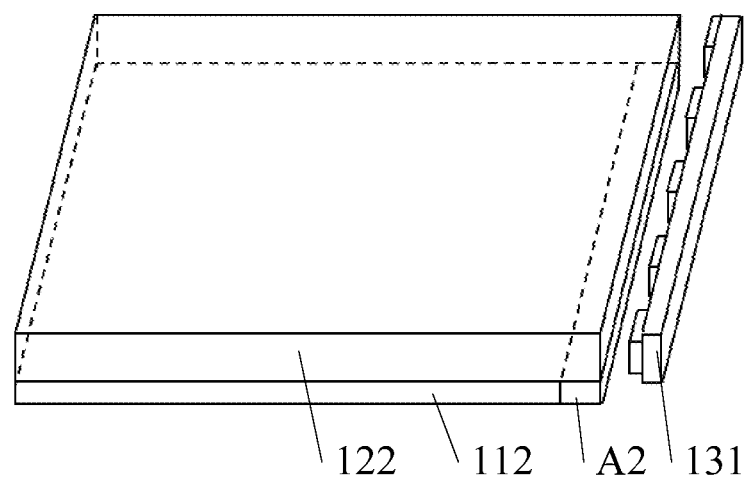
FIG. 4 is a schematic diagram showing a structure of a backlight module in which a photochromic material is coated on a surface of a reflector sheet, according to some embodiments of this disclosure.

FIG. 4 is a schematic diagram showing a structure of a backlight module in which a photochromic material is coated on a surface of a reflector sheet, according to some embodiments of this disclosure.

When the optical sheet is a reflector sheet of the backlight module, a transparent photochromic material is coated on the surface of the reflector sheet 112, and the photochromic material is coated in a location A2 close to the light source 131 of the backlight module. 122 refers to a combination of a diffusion sheet, a prism sheet and a light guide plate in the backlight module, the diffusion sheet in 122 has the same structure as the diffusion sheet in the related technologies, and the prism sheet in 122 has the same structure as the prism sheet in the related technologies.

Figure 5:
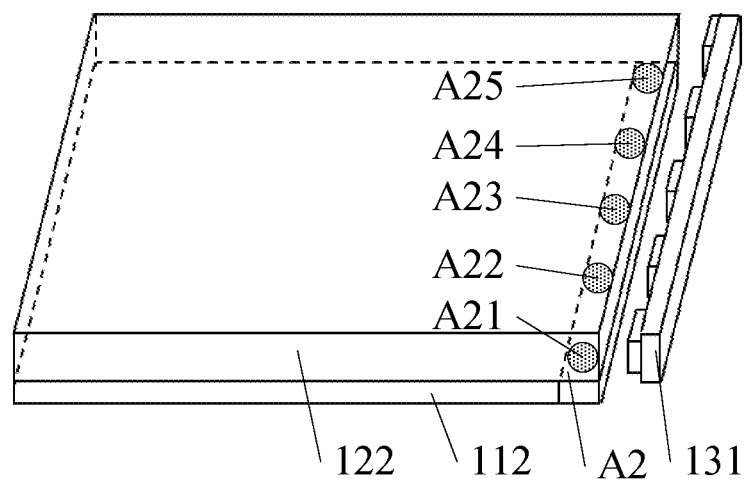
FIG. 5 is a schematic diagram showing a structure of a backlight module in which a photochromic material is coated on a surface of a reflector sheet, after its brightness uniformity is improved, according to some embodiments of this disclosure.

FIG. 5 is a schematic diagram showing a structure of a backlight module in which a photochromic material is coated on a surface of a reflector sheet, after its brightness uniformity is improved, according to some embodiments of this disclosure.

After the light source 131 is lighted, the photochromic material on the surface of the reflector sheet 112 maintains a transparent color when the brightness of the light incident to the reflector sheet 112 is even. When the light incident to the reflector sheet 112 has an uneven brightness, the light intensity value at the bright spot is larger than the critical light intensity value for which the photochromic material changes color, which makes the photochromic material at the bright spots change from transparent to black, which is shown as A21, A22, A23, A24 and A25 in FIG. 5. Therefore, it increases the light absorption rate at the bright spot, reduces the reflection on the light, effectively shields the bright spot, reduces the brightness difference between the bright spots and the dark spots, so as to improve brightness uniformity of the light passing through the reflector sheet.

In addition, the photochromic material can be coated on the surface of the prism sheet and near the light source, to improve the brightness uniformity of the light passing through the prism sheet.

According to the principle of improving the brightness uniformity of the optical sheet, the photochromic material can be coated on the upper surface and/or the lower surface of the diffusion sheet and near the light source. The photochromic material can also be coated on the upper surface and/or lower surface of the prism sheet and near the light source. The photochromic material can also be coated on the upper surface of the reflector sheet and near the light source.

In practical applications, the optical sheet may include a diffusion sheet, a prism sheet and a reflector sheet. The number of diffusion sheets can be one or two. When there are two diffusion sheets, the diffusion sheets can be divided into an upper diffusion sheet and a lower diffusion sheet according to a distance from a light exit surface of the light guide plate, wherein the distance between the upper diffusion sheet and the light exit surface of the light guide plate is larger, and the distance between the lower diffusion sheet and the light exit surface of the light guide plate is smaller. The number of prism sheets can also be one or two. When there are two prism sheets, the prism sheets can be divided into an upper prism sheet and a lower prism sheet according to a distance from the light exit surface of the light guide plate, wherein the distance between the upper prism sheet and the light exit surface of the light guide plate is larger, and the distance between the lower prism sheet and the light exit surface of the light guide plate is smaller.

For example, the photochromic material can be coated on the upper surface and/or lower surface of the upper diffusion sheet and near the light source. The photochromic material can also be coated on the upper surface and/or lower surface of the lower diffusion sheet and near the light source. The photochromic material can also be coated on the upper surface and/or lower surface of the upper prism sheet and near the light source.

Therefore, according to an actual structure of the backlight module, the photochromic material is coated on the surface of the corresponding optical sheet and near the light source.

Accordingly, the embodiments of this disclosure can also be used for improving hotspot defect.

The optical sheet in the embodiments of this disclosure may be a diffusion sheet, a prism sheet and a reflector sheet, and by coating a transparent photochromic material on the surface of any one or more of the optical sheets among them and near the light source, hotspot defect can be improved. Hotspot defect refers to the situation in which the hotspot is exposed to the effective light-emitting region of the backlight module, forming defects on the light incidence side of the screen.

The diffusion sheet and the prism sheet are located above the light guide plate, i.e., located on the light exit side of the light guide plate. The photochromic material can be coated on the surface of the diffusion sheet and near the light source. The background color of the diffusion sheet is a transparent color, which has a function of unifying the light emitted by the light guide plate. When no hotspot defect occurs, the photochromic material maintains a transparent color, and the display of the screen is not effected. When hotspot defect occurs, the light intensity value at the bright spot is larger than the critical light intensity value for which the photochromic material changes color, which makes the photochromic material change from transparent to black. Therefore, it can effectively shield the bright spot, decrease the light transmittance at the bright spot, reduce the brightness difference between the bright spots and the dark spots, and effectively improve hotspot defect. The photochromic material can be also coated on the surface of the prism sheet and near the light source, which has the same principle of improving hotspot defect as the diffusion sheet.

The reflector sheet is located below the light guide plate, i.e., located on a side away from the light exit surface of the light guide plate. The background color of the reflector sheet is a transparent color, which can reflect the light emitted by the light guide plate and thus increases the utilization of the light. When no hotspot defect occurs, the photochromic material maintains a transparent color, and the display of the screen is not affected. When hotspot defect occurs, the light intensity value at the bright spot is larger than the critical light intensity value for which the photochromic material changes color, which makes the photochromic material change from transparent to black. Therefore, it increases the light absorption rate at the bright spot, reduces the reflection on the light, effectively shields the bright spot, reduces the brightness difference between the bright spots and the dark spots, and effectively improves hotspot defect. A specific description of the optical sheet can refer to the description in the previous embodiments, and is omitted in this embodiment.

Of course, the backlight module can also include backlight module components such as glue frame, front frame, which are similar to conventional backlight module components and thus are omitted in this embodiment.

In the embodiments of this disclosure, the backlight module comprises a light source, a light guide plate and an optical sheet. By coating the transparent photochromic material in at least part of the locations on the surface of the optical sheet, when the light incident to the optical sheet has an uneven brightness, the light intensity value at the corresponding bright spot is larger than the critical light intensity value for which the photochromic material changes color, which makes the photochromic material change from transparent to black. Therefore, it can effectively shield the bright spot, decrease the light transmittance at the bright spot, reduce the brightness difference between the bright spots and the dark spots, so as to improve brightness uniformity of the light passing through the optical sheet, and at the same time improve brightness uniformity of the light emitted by the backlight module.

Some embodiments of this disclosure further provide a display device comprising the aforementioned backlight module, wherein the backlight module comprises a light source, a light guide plate and an optical sheet, wherein a transparent photochromic material is coated in at least part of the locations on a surface of the optical sheet.

The photochromic material is coated in a location close to the light source of the backlight module, to shield bright spots when the bright spots appear on the light guide plate of the backlight module and near the light source.

The optical sheet comprises one or more of a diffusion sheet, a prism sheet, and a reflector sheet. The light source is a LED light source.

A specific description of the backlight module may refer to the previous embodiments, and is omitted in this embodiment.

The display device can be any product or component having a display function, such as a mobile phone, a tablet computer, a TV set, a monitor, a notebook computer, a navigator, etc.

Because the display device in this embodiment comprises the backlight module in the previous embodiments, it has a better display effect.

In the embodiments of this disclosure, the display device comprises a backlight module, wherein the backlight module comprises a light source, a light guide plate and an optical sheet. By coating a transparent photochromic material in at least part of the locations on the surface of the optical sheet, when the light incident to the optical sheet has an uneven brightness, the light intensity value at the corresponding bright spot is larger than the critical light intensity value for which the photochromic material changes color, which makes the photochromic material change from transparent to black. Therefore, it can effectively shield the bright spot, decrease the light transmittance at the bright spot, reduce the brightness difference between the bright spots and the dark spots, so as to improve the brightness uniformity of the display device.

The alternative embodiments of this disclosure have been described in detail above, however, this disclosure is not limited to the specific details in the above embodiments, and within the scope of the technical concept of this disclosure, a variety of simple variants can be made to the technical solutions of this disclosure, and these simple variants fall within the scope of protection of this disclosure. It should be further noted that, the various specific technical features described in the above specific embodiments, if without conflicts, can be combined in any appropriate manner, and in order to avoid unnecessary repetitions, various possible combinations are omitted in this disclosure. In addition, different embodiments of this disclosure can be arbitrarily combined, as long as the combinations are not contrary to the idea of this disclosure, and the combinations shall also be regarded as the contents disclosed in this disclosure.

Each embodiment in the specification is described in a progressive manner, each embodiment focuses on differences from other embodiments, and the same or similar parts between the embodiments may refer to each other.

In addition, those skilled in the art would appreciate that, although some of the embodiments described herein include some features included in other embodiments rather than other features, combinations of the features in different embodiments mean that they are within the scope of this disclosure and that different embodiments are formed. For example, in the following claims, any one of the embodiments sought for protection can be used in any combination.

Although the alternative embodiments of this application have been described, additional changes and modifications can be made to these embodiments as soon as those skilled in the art are informed of the basic creative concepts. Therefore, the attached claims are intended to be construed as including the alternative embodiments and all changes and modifications that fall into the scope of the embodiments of this application.

Finally, it should be further noted that, in this specification, relational terms such as first and second are used only to differentiate an entity or operation from another entity or operation, without necessarily requiring or implying any such actual relationship or order between these entities or operations. Furthermore, the term "comprise", "include" or any other variant is intended to cover non-exclusive inclusion, such that a process, method, article or apparatus comprising a set of elements not only comprises those elements, but also comprises other elements not explicitly listed, or also comprises inherent elements of such process, method, article or apparatus. Without more restrictions, the element defined by the statement "comprising a . . . " does not exclude the fact that an additional same element also exists in the process, method, article or apparatus comprising the element.

The optical sheet, backlight module and display device provided by this disclosure are discussed in detail above. The principle and embodiments of this disclosure are described by using specific examples. The foregoing descriptions of the embodiments are merely for understanding the method and core ideas of this disclosure. Meanwhile, persons of ordinary skill in the art may make modifications to the specific embodiments and application scope according to the ideas of this disclosure. To sum up, the contents of the specification shall not be construed as a limitation to this disclosure.

What is claimed is:

1. An optical sheet, wherein a transparent photochromic material is on part of locations on a surface of the optical sheet, the optical sheet is comprised in a backlight module, the transparent photochromic material is disposed facing a light source of the backlight module, when bright spots are generated by light from the light source in a location on a light guide plate of the backlight module and near the light source, the transparent photochromic material at the bright spots changes from transparent to black, so as to shield the bright spots, and the transparent photochromic material has a critical light intensity value relating to a property of the transparent photochromic material and a target brightness of the light, wherein a width of the transparent photochromic material is 10 mm to 20 mm, a thickness of the transparent photochromic material is less than 200 μm, and the transparent photochromic material comprises a transparent resin mixed with photochromic pigments.

2. The optical sheet according to claim 1, wherein the transparent photochromic material comprises an organic photochromic material.

3. The optical sheet according to claim 1, wherein the transparent photochromic material comprises an inorganic photochromic material.

4. The optical sheet according to claim 2, wherein the organic photochromic material comprises one or more of spiropyrans, fulgides, diarylethenes, or azobenzenes.

5. The optical sheet according to claim 3, wherein the inorganic photochromic material comprises one or more of transition metal oxides, metal halides or rare earth complexes.

6. A backlight module comprising a light source, a light guide plate, and an optical sheet, wherein a transparent photochromic material is on part of locations on a surface of the optical sheet, the transparent photochromic material is disposed facing the light source of the backlight module, when bright spots are generated by light from the light source in a location on the light guide plate of the backlight module and near the light source, the transparent photochromic material at the bright spots changes from transparent to black, so as to shield the bright spots, and the transparent photochromic material has a critical light intensity value relating to a property of the transparent photochromic material and a target brightness of the light, wherein a width of the transparent photochromic material is 10 mm to 20 mm, a thickness of the transparent photochromic material is less than 200 μm, and the transparent photochromic material comprises a transparent resin mixed with photochromic pigments.

7. The backlight module according to claim 6, wherein the optical sheet comprises one or more of a diffusion sheet, a prism sheet, or a reflector sheet.

8. The backlight module according to claim 6, wherein the light source is a LED light source.

9. The backlight module according to claim 6, wherein the transparent photochromic material comprises an organic photochromic material.

10. The backlight module according to claim 6, wherein the transparent organic photochromic material comprises one or more of spiropyrans, fulgides, diarylethenes, or azobenzenes.

11. The backlight module according to claim 6, wherein the transparent photochromic material comprises an inorganic photochromic material.

12. The backlight module according to claim 10, wherein the inorganic transparent photochromic material comprises one or more of transition metal oxides, metal halides, or rare earth complexes.

13. A display device comprising a backlight module, the backlight module comprising a light source, a light guide plate, and an optical sheet, wherein a transparent photochromic material is on part of locations on a surface of the optical sheet, and the transparent photochromic material is disposed facing the light source of the backlight module, when bright spots are generated by light from the light source in a location on the light guide plate of the backlight module and near the light source, the transparent photochromic material at the bright spots changes from transparent to black, so as to shield the bright spots, and the transparent photochromic material has a critical light intensity value relating to a property of the transparent photochromic material and a target brightness of the light, wherein a width of the transparent photochromic material is 10 mm to 20 mm, a thickness of the transparent photochromic material is less than 200 μm, and the transparent photochromic material comprises a transparent resin mixed with photochromic pigments.

* * * * *